(12) United States Patent
Terada et al.

(10) Patent No.: US 8,434,508 B2
(45) Date of Patent: May 7, 2013

(54) RELIEF VALVE

(75) Inventors: Mitsuru Terada, Okazaki (JP); Yuta Inoue, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 517 days.

(21) Appl. No.: 12/750,115

(22) Filed: Mar. 30, 2010

(65) Prior Publication Data

US 2010/0243940 A1 Sep. 30, 2010

(30) Foreign Application Priority Data

Mar. 31, 2009 (JP) .................................. 2009-086586
Mar. 10, 2010 (JP) .................................. 2010-053415

(51) Int. Cl.
*F16K 17/06* (2006.01)

(52) U.S. Cl.
USPC ...... 137/115.13; 137/529; 137/538; 137/540; 417/311

(58) Field of Classification Search .................. 137/538, 137/528, 625.65, 115.01, 115.13, 115.18, 137/540; 417/311
See application file for complete search history.

(56) References Cited

U.S. PATENT DOCUMENTS

| | | | | |
|---|---|---|---|---|
| 1,730,294 A | * | 10/1929 | Reed et al. | 137/528 |
| 1,735,117 A | * | 11/1929 | Kiger et al. | 137/538 |
| 1,879,020 A | * | 9/1932 | Balsiger | 137/538 |
| 2,011,333 A | * | 8/1935 | Clifton | 137/538 |
| 2,287,840 A | * | 6/1942 | Stratton | 137/469 |
| 2,411,930 A | * | 12/1946 | Mathys | 137/470 |
| 2,574,414 A | * | 11/1951 | Douglas | 137/492 |
| 3,017,897 A | * | 1/1962 | Seguenot | 137/529 |

(Continued)

FOREIGN PATENT DOCUMENTS

| | | |
|---|---|---|
| DE | 25 53 736 A1 | 8/1976 |
| GB | 747667 A | 4/1956 |
| JP | 5-195742 A | 8/1993 |

OTHER PUBLICATIONS

Journal of Technical Disclosure No. 2006-505946, Nov. 9, 2006, AK06-0509, 2 pages.
European Search Report issued Oct. 15, 2012 by the European Patent Office in corresponding European Application No. 10157788.0 (5 pgs).

*Primary Examiner* — John Rivell
*Assistant Examiner* — Minh Le
(74) *Attorney, Agent, or Firm* — Buchanan Ingersoll & Rooney PC (57) ABSTRACT

A relief valve includes a valve body having a first port through which fluid flows in and a second port through which the fluid is discharged, a sleeve arranged so as to be slidable within the valve body and formed with an inlet being communicatable with the first port and an outlet being communicatable with the second port, a valve being slidable within the sleeve by receiving a fluid pressure of the first port flowing through the inlet in order to establish a closing state at which the outlet is closed by the valve and an opening state at which the outlet is opened, a biasing member applying a biasing force to the valve and a valve position adjusting mechanism actuated for operating the fluid pressure of the first port so as to act on the sleeve in a direction of the biasing force of the biasing member and changing the position of the sleeve relative to the valve body by turning on or off the operation of the fluid pressure of the first port so as to act on the sleeve.

13 Claims, 6 Drawing Sheets

U.S. PATENT DOCUMENTS

| | | |
|---|---|---|
| 3,980,095 A | 9/1976 | McAvoy |
| 4,501,291 A * | 2/1985 | Siegrist .................... 137/529 |
| 5,018,547 A * | 5/1991 | Alcorn ..................... 137/111 |
| 5,234,028 A * | 8/1993 | Takano et al. ............... 137/529 |
| 6,352,085 B1 * | 3/2002 | Morita et al. ............ 137/516.27 |
| 6,510,867 B2 * | 1/2003 | LaFleur .................. 137/514.7 |
| 6,543,476 B2 * | 4/2003 | Kazaoka .................... 137/538 |
| 2001/0022195 A1 * | 9/2001 | Kazaoka .................... 137/538 |
| 2006/0185737 A1 * | 8/2006 | Williamson et al. .......... 137/538 |
| 2008/0276997 A1 * | 11/2008 | Courtright et al. ........... 137/540 |

* cited by examiner

RELIEF VALVE

CROSS REFERENCE TO RELATED APPLICATIONS

This application is based on and claims priority under 35 U.S.C. §119 to Japanese Patent Application 2009-086586, filed on Mar. 31, 2009, and Japanese Patent Application 2010-053415, field on Mar. 10, 2010, the entire content of which is incorporated herein by reference.

TECHNICAL FIELD

This disclosure relates to a relief valve used for adjusting a level of pressure of fluid (e.g., oil pressure) used for lubricating an engine or the like, the relief valve having a function to change a level of pressure to open a valve.

BACKGROUND DISCUSSION

The relief valve generally controls an oil pressure within a hydraulic circuit so as not to be greater than a predetermined level by opening a passage through which an excess oil in the hydraulic circuit may be discharged when the oil pressure within the hydraulic circuit reaches or is greater than a predetermined level. For example, a relief valve, disclosed in Journal of Technical Disclosure No. 2006-505946, Japan Institute of Invention and Innovation (Nov. 9, 2006), is configured by a body, a valve, a spring, a retainer, a plug, an oil passage provided so as to be connected to a portion formed between the retainer and a plug and through which the oil flows, and a back-pressure control valve for controlling the flow of the oil. According to the relief valve disclosed in Journal of Technical Disclosure No. 2006-505946, when the oil does not flow into the portion formed between the retainer and the plug, the retainer is arranged in the vicinity of an end surface of the plug, and at this point, the length of the spring becomes longest (e.g., the spring is extended), accordingly a level of pressure to open the relief valve, so that the oil sucked by an oil pump is discharged toward the upstream of the oil flow relative to the relief valve, is set to be low (e.g., a low pressure state), on the other hand, when the oil flows into the portion formed between the retainer and the plug, the retainer is moved upwardly so as to compress the spring, accordingly the level of the pressure to open the valve of the relief valve is set to be high (e.g., a high pressure state).

According to the known relief valve, an error may occur while the level of the pressure to open the valve is controlled in accordance with a driving condition. When the error occurs, the relief valve may remain its state in one of the high and low pressure states and may not be moved toward the other of the high and low pressure states. For example, according to the relief valve disclosed in Journal of Technical Disclosure No. 2006-505946, when an error occurs, for example the back-pressure control valve is clogged due to, for example sludge of the oil, the oil may not flow to the portion formed between the retainer and the plug, as a result, the pressure to open the valve may be maintained at the low level. In this condition, even when a rotational speed of the engine is high at which the oil needs to be provided in order to lubricate each part of the engine, because the level of the pressure to open the valve is set to be low, the relief valve may be easily opened so that the oil may be discharged through a drain. Accordingly, the oil may not be supplied to each part of the engine, and the engine may eventually burn out.

A need thus exists for a relief valve, which is not susceptible to the drawback mentioned above.

SUMMARY

According to an aspect of this disclosure, a relief valve includes a valve body having a first port through which fluid flows in the relief valve and a second port through which the fluid is discharged from the relief valve, a sleeve arranged so as to be slidable within the valve body and formed in a cylindrical shape having an inlet being communicatable with the first port and an outlet being communicatable with the second port, a valve being slidable within the sleeve by receiving a fluid pressure of the first port flowing through the inlet in order to establish a closing state at which the outlet is closed by the valve and an opening state at which the outlet is opened, the valve positioned so as to approach the inlet in the closing state and positioned so as to be distant from the inlet in the opening state, a biasing member applying a biasing force to the valve in a direction against the fluid pressure of the first port and a valve position adjusting mechanism actuated for operating the fluid pressure of the first port so as to act on the sleeve in a direction of the biasing force of the biasing member and changing the position of the sleeve relative to the valve body by turning on or off the operation of the fluid pressure of the first port so as to act on the sleeve.

According to another aspect of this disclosure, a relief valve includes a valve body including a first port and a second port, a sleeve accommodated within the valve body and having an inlet being communicatable with the first port and an outlet being communicatable with the second port, a valve, accommodated within the sleeve, being moved to a side of the inlet in order to restrict a communication between the inlet and the outlet so and being moved to an opposite side of the inlet in order to allow the communication between the inlet and the outlet, a biasing member applying a biasing force to the valve so as to move toward the inlet and a valve position adjusting mechanism actuated for changing positions of the sleeve and the valve relative to the valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a relief valve 1 for controlling a fluid pressure within a fluid supplying passage 10 through which fluid (e.g., oil) is supplied to an engine will be explained in accordance with the drawings attached hereto.

As indicated in the drawings of FIGS. 1 through 4, while the engine is actuated, an oil pump 20 sucks fluid (e.g., oil) stored in an oil pan 21 and the sucked oil flowing through the fluid supplying passage 10 is injected to parts of the engine to be lubricated. The relief valve 1 is configured by a valve body 2, a sleeve 4, a valve 5 and a biasing member 6 (e.g., a spring) and is provided in the fluid supplying passage 10. Specifically, the sleeve 4 is formed in a cylindrical shape and is provided within the valve body 2 so as to be slidable therein, the valve 5 is provided within the sleeve 4 so as to be slidable therein, and the biasing member 6 is arranged so as to bias the valve 5.

More specifically, the valve body 2 includes a first port 11 by which the fluid enters the relief valve 1 and a second port 12 by which the fluid within the relief valve 1 is discharged. The sleeve 4 includes an inlet 7 being communicatable with the first port 11 and an outlet 8 being in communication communicatable with the second port 12. As a matter of convenience, one end of the sleeve 4 at the side of the first port 11 will be referred to as a first end portion, and the other end of the sleeve 4 at the side opposite to the first port 11 will be referred to as a second end portion. The valve 5 slides within the sleeve 4 by receiving a pressure of the fluid of the first port 11 entering through the inlet 7. The valve 5 is moved to approach the inlet 7 so as to close the outlet 8 (a closing state) and is moved to be distant from the inlet 7 so as to open the outlet 8 (an opening state). The term "approach" indicates that the valve 5 move to a side of the inlet 7 in an axial direction of the sleeve 4. Also the term "distant" indicates that the valve 5 move to an opposite side of the inlet 7 in the axial direction of the sleeve 4. The biasing member 6 is arranged so as to apply the biasing force to the valve 5 against the fluid pressure of the first port 11. In other words, the valve body 2 including the first port 11 and the second port 12. The sleeve 4 accommodated within the valve body 2 and having the inlet 7 being communicatable with the first port 11 and the outlet 8 being communicatable with the second port 12. The valve 5, accommodated within the sleeve 4, being moved to a side of the inlet 7 in order to restrict a communication between the inlet 7 and the outlet 8 so and being moved to an opposite side of the inlet 7 in order to allow the communication between the inlet 7 and the outlet 8. And the biasing member 6 applying the biasing force to the valve 5 so as to move toward the inlet 7.

The relief valve 1 further includes a valve position adjusting mechanism 13 for adjusting (e.g., changing) the position of the sleeve 4 relative to the valve body 2. In other words, the valve position adjusting mechanism 13 actuated for changing positions of the sleeve 4 and the valve 5 relative to the valve body 2. The valve position adjusting mechanism 13 is configured by a back-pressure fluid supplying passage 14 and an oil switching valve (OSV) 15. The back-pressure fluid supplying passage 14 branches from the fluid supplying passage 10 and is connectable to the second end portion of the sleeve 4. The OSV 15 is provided within the back-pressure fluid supplying passage 14 in order to turn on/off the acting of the fluid pressure on the first port 11.

Figure 1:
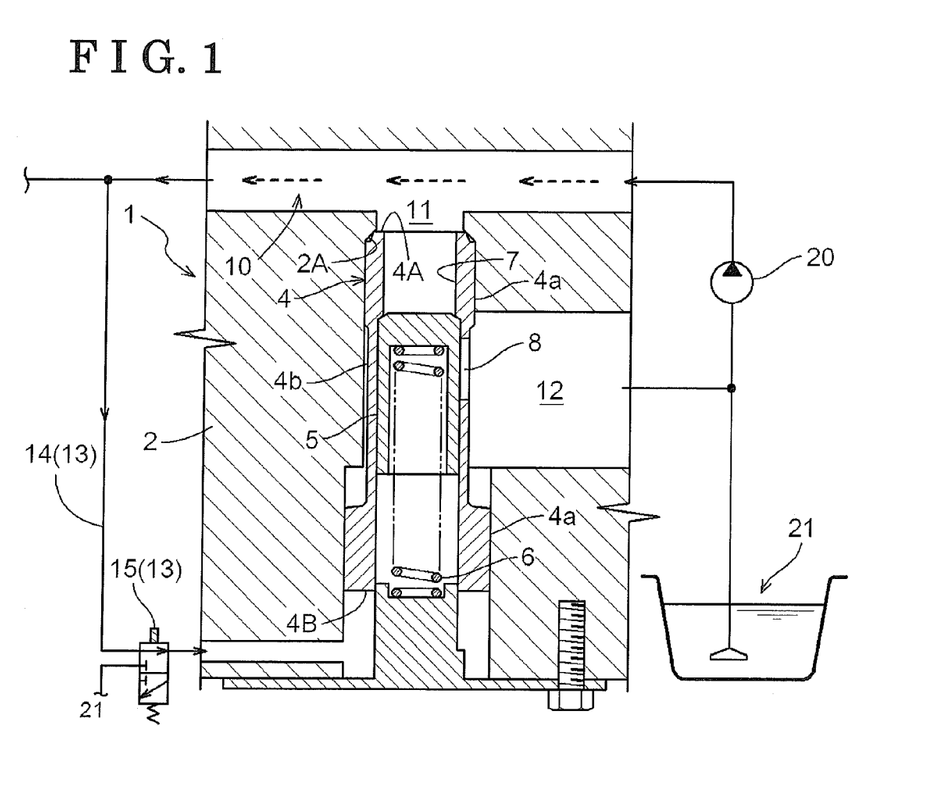
FIG. 1 illustrates a diagram indicating an example state of a relief valve related to this disclosure where a level of a pressure to open a valve is set to be low.
Figure 2:
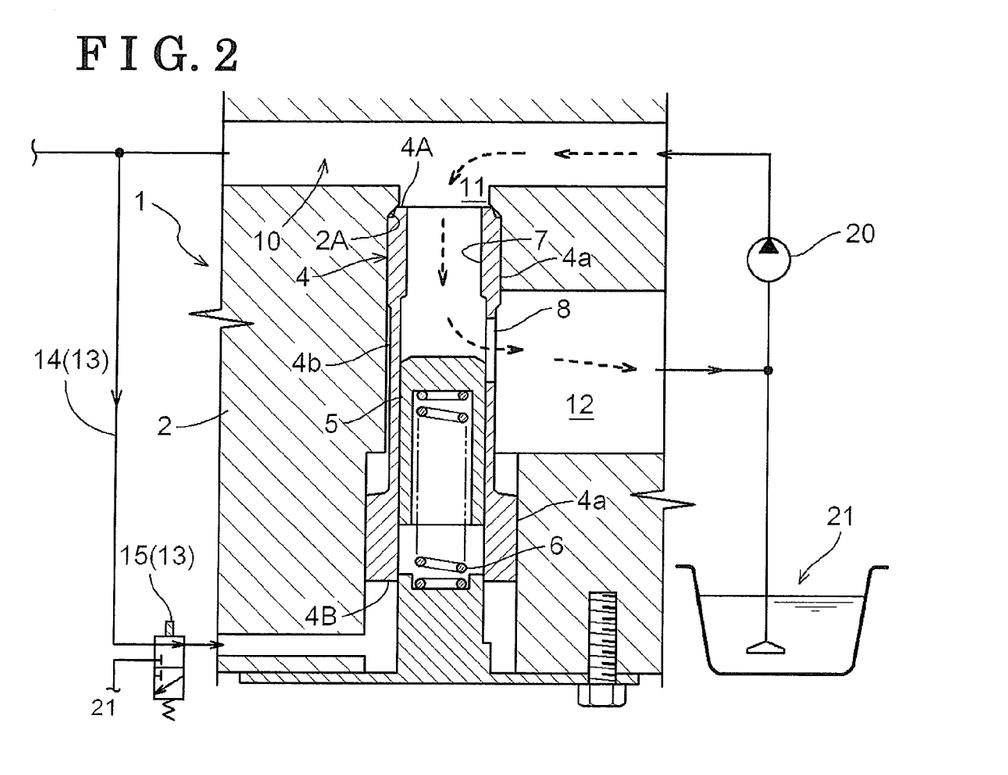
FIG. 2 illustrates a diagram indicating an example state of the relief valve related to this disclosure where the level of the pressure to open a valve is set to be low.
Figure 3:
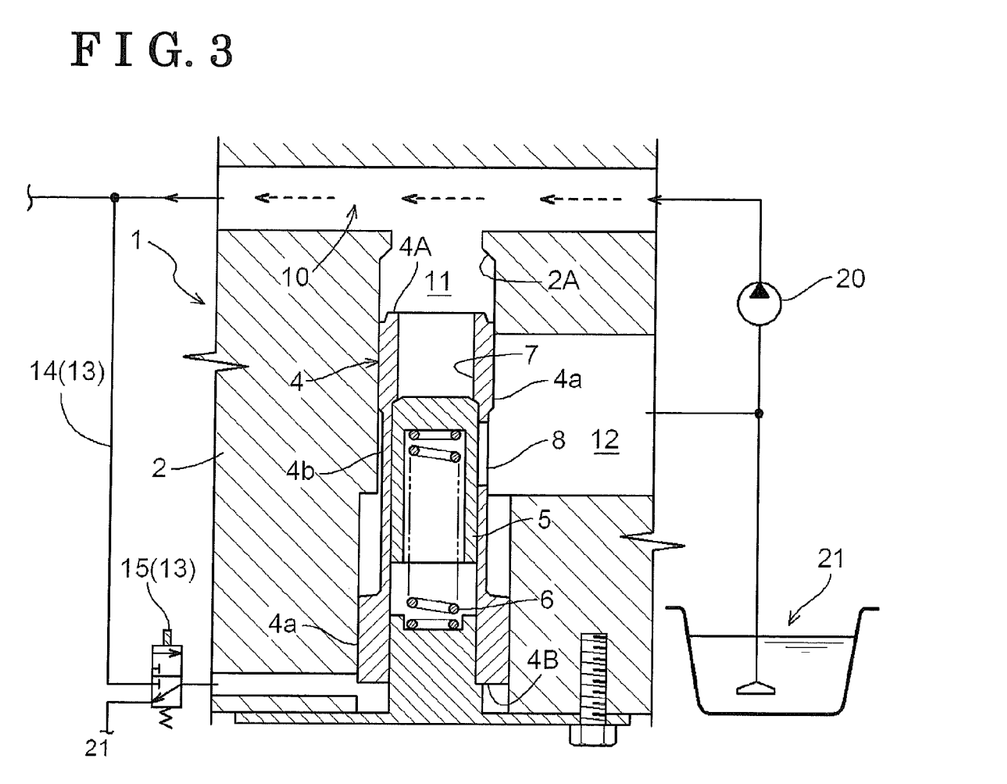
FIG. 3 illustrates a diagram indicating an example state of the relief valve related to this disclosure where the level of a pressure to open a valve is set to be high.
Figure 4:
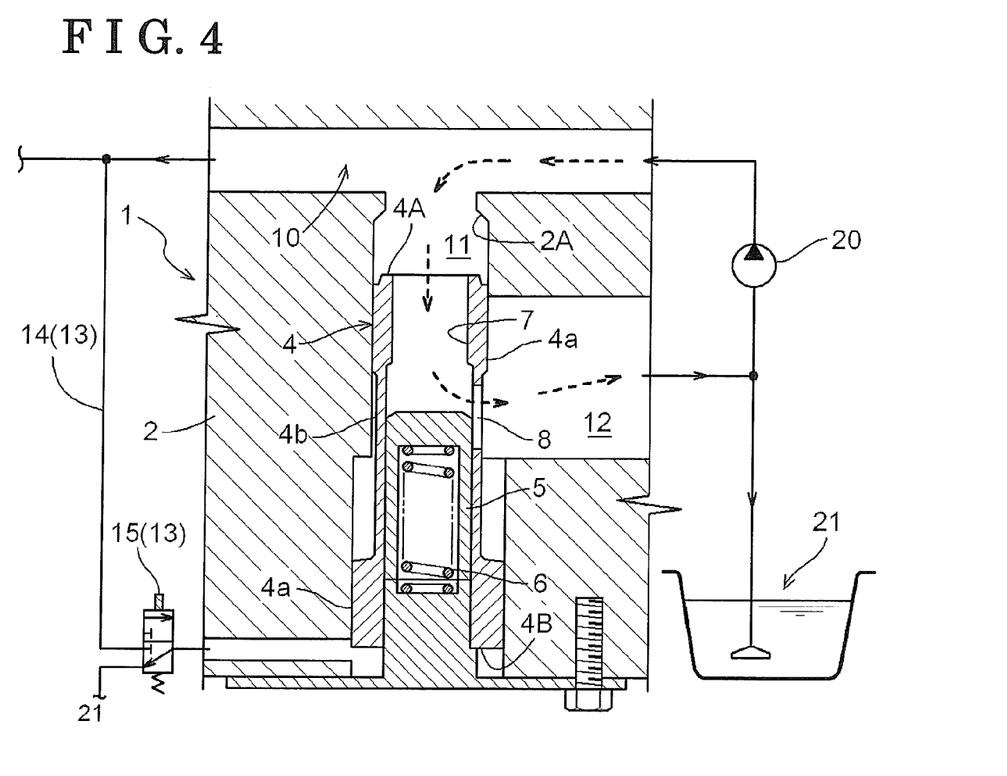
FIG. 4 illustrates a diagram indicating an example state of the relief valve related to this disclosure where the level of the pressure to open a valve is set to be high.

When the OSV 15 is turned on (e.g., a first state), as illustrated in FIGS. 1 and 2, the fluid of the fluid supplying passage 10 flows through the back-pressure fluid supplying passage 14 toward the second end portion of the sleeve 4, and the fluid pressure of the first port 11 acts on the sleeve 4 in a direction against the fluid pressure of the first port 11. On the other hand, when the OSV 15 is turned off (e.g., a second state), as illustrated in FIGS. 3 and 4, the fluid of the fluid supplying passage 10 does not flow through the back-pressure fluid supplying passage 14 toward the second end portion of the sleeve 4, and the fluid pressure of the first port 11 does not act on the sleeve 4 in the direction against the fluid pressure from the first port 11.

The sleeve 4 includes a first end surface 4A and a second end surface 4B. The first end surface 4A faces the first port 11, and the second end surface 4B faces the back-pressure fluid supplying passage 14 of the valve position adjusting mechanism 13. An area of the second end surface 4B is set to be larger than that of the first end surface 4A. Because of this area difference between the first and second end surfaces 4A and 4B, when the fluid pressure of the first port 11 acts on the second end surface 4B, the fluid pressure acting on the second end surface 4B becomes greater than the fluid pressure acting on the first end surface 4A, thereby moving the sleeve 4 toward the first port 11. Thus, the sleeve 4 may be moved toward the first port 11 or the second port 12 by operating the OSV 15 to be turned on/off.

[Normal Operation]

When the OSV 15 is turned on, the fluid pressure of the first port 11 acts on the sleeve 4 in the direction against the fluid pressure from the first port 11, thereby moving the sleeve 4 toward the first port 11. When the sleeve 4 is positioned at the side of the first port 11, the outlet 8 also approaches the first port 11. Further, the valve 5 is also moved toward the first port 11 together with the sleeve 4 by means of the biasing member 6, and the biasing member 6 is turned in an extended state. Because the biasing member 6 being in the extended state is easily pressed (e.g., returned) toward the second end portion of the sleeve 4, even when the level of the fluid pressure of the fluid supplying passage 10 is relatively low, as illustrated in FIG. 2, the biasing member 6 can be pressed toward the second end portion of the sleeve 4 so that the valve 5 is distant from the inlet 7 of the sleeve 4 in order to open the outlet 8 of the sleeve 4 (opening state). Thus, the first port 11 communicates with the second port 12 so that excess fluid (oil) can be refluxed to the inlet of the oil pump 20. In this condition, the level of the pressure to open the valve of the relief valve 1 is set to be low (a first pressure value). In other words, when the OSV 15 (the valve position adjusting mechanism 13) is actuated, the fluid pressure of the first port 11 acts on the valve 5 at the first pressure value or more in order to discharge the fluid through the outlet 8.

On the other hand, when the OSV 15 is turned off, the fluid pressure of the first port 11 does not act on the sleeve 4 in the direction against the fluid pressure from the first port 11, and only the fluid pressure of the first port 11 acts on the sleeve 4, thereby moving the sleeve 4 toward the second port 12. When the sleeve 4 is positioned at the side of the second port 12, the outlet 8 is also positioned apart from the first port 11. Further, because the valve 5 is also moved toward the second port 12 together with the sleeve 4, and the biasing member 6 is turned in a compressed state. Because the compressed biasing member 6 is not easily further pressed toward the second end portion, when the level of the fluid pressure of the fluid supplying passage 10 is relatively low, the biasing member 6 is not pressed toward the second end portion of the sleeve 4, and as illustrated in FIG. 3, the valve 5 is maintained to be at a position where the outlet 8 of the sleeve 4 is closed (closing state). When the level of the fluid pressure of the fluid supplying passage 10 is relatively high, as illustrated in FIG. 4, the compressed biasing member 6 can be further pressed toward the second end portion of the sleeve 4 so that the valve 5 is distant from the inlet 7 of the sleeve 4 in order to open the outlet 8 of the sleeve 4 (opening state). Thus, the first port 11 communicates with the second port 12 so that excess fluid (oil) can be refluxed to the inlet of the oil pump 20. In this condition, the level of the pressure to open the valve of the relief valve 1 is set to be high (a second pressure value). In other words, when the valve position adjusting mechanism 13 is not actuated, the fluid pressure of the first port 11 acts on the valve 5 at the second pressure value or more in order to discharge the fluid through the outlet 8.

The pressure to open the relief valve 1 (the valve 5) is a fluid pressure required to establish the communication between the inlet 7 and the outlet 8. Specifically, the fluid (oil) sucked and discharged by the oil pump 20 acts on the valve 5, thereby being moved against the biasing force of the biasing member 6 so as to be distant from the sleeve 4, accordingly a communication between the inlet 7 and the outlet 8 is established. When the level of the pressure to open the valve is set to be low (the first pressure value), the communication between the inlet 7 and the outlet 8 may be established by a relatively low fluid pressure compared to the case where the level of the pressure to open the valve is set to be high (the second pressure value).

[Failure Occurs due to a Clogging within the Back-Pressure Fluid Supplying passage]

When the back-pressure fluid supplying passage 14 is clogged due to sludge or the like while the engine is actuated, even when the OSV 15 is turned on, in the same manner where the OSV 15 is turned OFF as illustrated in FIGS. 3 and 4, the fluid within the fluid supplying passage 10 may not flow toward the second end portion of the sleeve 4. In this case, the fluid pressure of the first port 11 does not act on the sleeve 4 in the direction against the fluid pressure of the first port 11. Accordingly, in the relief valve 1, only the fluid pressure of the first port 11 acts on the sleeve 4, and the sleeve 4 is moved toward the second port 12. In this condition, the level of the pressure to open the valve of the relief valve 1 is set to be high (the second pressure value).

Thus, the relief valve related to this disclosure is configured so that the level of the pressure to open the valve 5 of the relief valve 1 becomes high when the back-pressure fluid supplying passage 14 is clogged due to sludge or the like. Accordingly, when the level of the fluid pressure of the fluid supplying passage 10 is relatively low, the valve 5 is maintained to be in the closing state, thereby continuously supplying the fluid to the engine. Thus, a level of possibility where a failure such as an engine-burned-out caused by the failure to supply the oil to the engine occurs may be reduced in advance.

Figure 5:
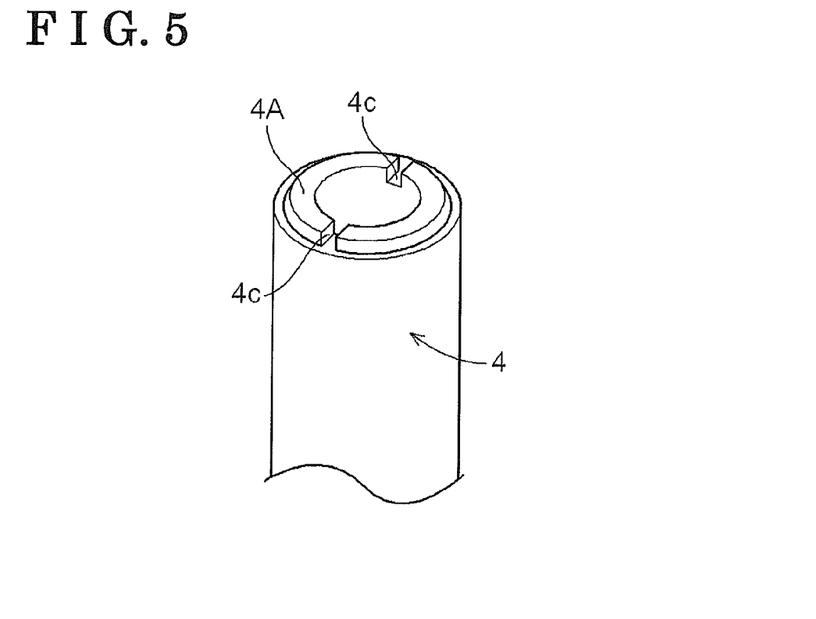
FIG. 5 illustrates a diagram indicating a shape of a sleeve of the relief valve related to this disclosure.

The first end surface 4A facing the first port 11 includes an outer annular surface, an inner annular surface and a connecting tapered surface. The outer annular surface is formed so as to flatly and entirely extend in a circumferential direction, the inner annular surface is also formed so as to flatly and entirely extend in a circumferential direction and is arranged closer to the first port relative to the outer annular surface, and the tapered connecting surface is formed so as to continuously connect the inner annular surface and the outer annular surface by being tapered by a positional difference therebetween. The first end surface 4A further includes recessed portions 4c formed so as to extend from the inner annular surface to the outer annular surface. When the sleeve 4 is positioned at the side of the first port 11, the first end surface 4A contacts a contact surface 2A of the valve body 2 at the side of the first port 11. At this point, the first end surface 4A closely contacts the contact surface 2A, and a fluid passage on an outer periphery of the first end surface 4A is narrowed, accordingly the fluid from the first port 11 may not flow into the fluid passage on the outer periphery of the first end surface 4A. However, because the recessed portions 4c are formed on the first end surface 4A, the fluid from the first port 11 may flow onto the entire surface of the first end surface 4A through the recessed portion 4c. Thus, the fluid pressure of the first port 11 is supplied to the entire surface of the first end surface 4A, thereby smoothing the movement of the sleeve 4.

Further, as illustrated in FIGS. 1 through 4, the sleeve 4 is formed with sliding surfaces 4a, one of the sliding surfaces 4a formed at the side of the first end surface 4A and the other of the sliding surfaces 4a formed at the side of the second end surface 4B. The sleeve 4 is formed with an outer and central circumferential surface 4b at a central portion in a longitudinal direction of the sleeve 4 between the sliding surfaces 4a, the outer and central circumferential surface 4b being formed so as not to contact an inner surface of the valve body 2. Because the position and a posture of the sleeve 4 may be changed by the fluid pressure of the first port 11, the level of a sliding resistance of the sleeve 4 relative to the valve body 2 may preferably be set at a smallest level as possible. Accordingly, in the embodiment, the sliding surface 4a is set in the vicinity of each of the end surfaces 4A and 4B in order to reduce a total area of the sliding surfaces between the valve body 2 and the sleeve 4 and reduces a friction force generated between the valve body 2 and the sleeve 4 by maintaining the posture of the sleeve 4 so as not to be inclined as much possible. Because of the sliding surfaces 4a, the sleeve 4 provided within the valve body 2 may be maintained so as not to be inclined relative to an axial direction of the cylindrical portion of the valve body 2, and the sleeve 4 may be moved between the first port 11 and the second port 12 with keeping its posture so as to be along the axial direction of the cylindrical portion of the valve body 2.

[Other Embodiments]

Figure 6:
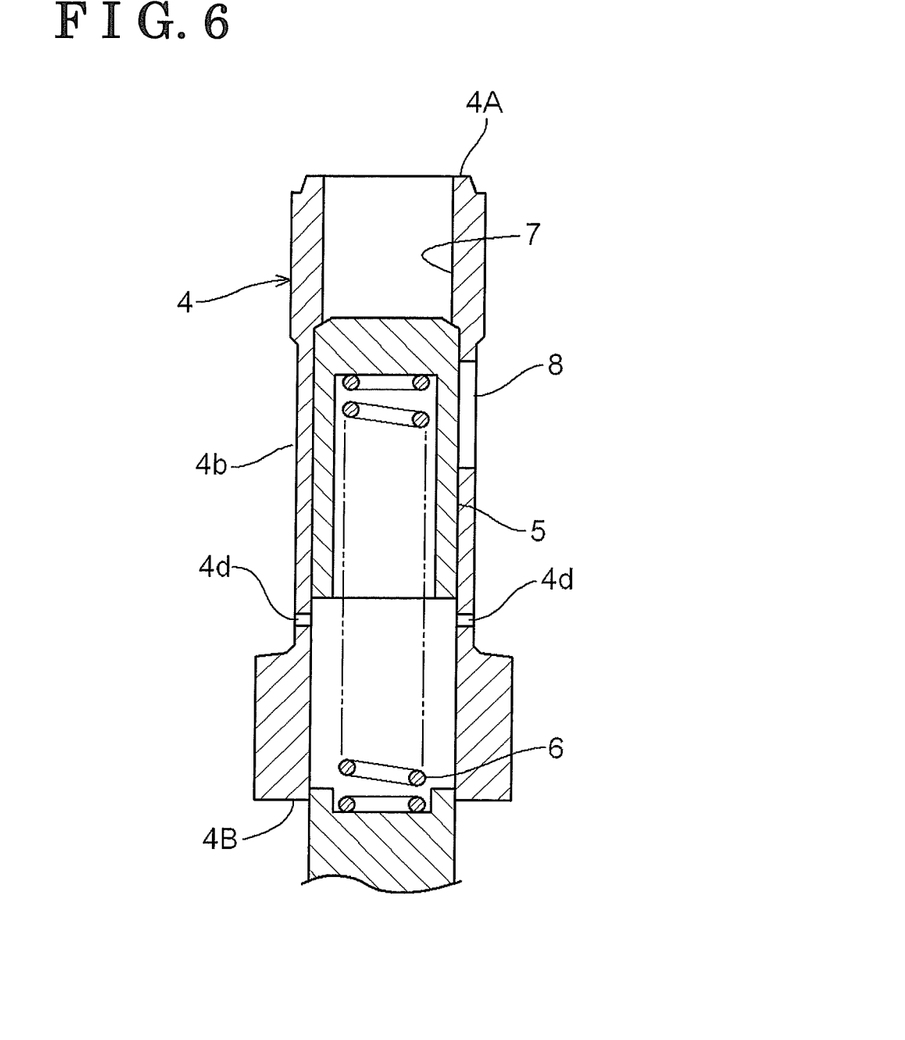
FIG. 6 illustrates a diagram indicating another embodiment of the relief valve related to this disclosure.

According to the relief valve 1 of the embodiment, the sleeve 4 may be formed with first through holes 4d through which fluid or air existing within the sleeve 4 at the side where the first port 11 is not provided relative to the valve 5 may be discharged. The first through hole 4d may be formed on the outer and central circumferential surface 4b of the sleeve 4 at the side where the first port 11 is not provided (e.g., in the vicinity of the second end portion of the sleeve 4) as illustrated in FIG. 6. The fluid or the air existing within the sleeve at the side where the first port 11 is not provided relative to the valve 5 will be referred to as the fluid or the air within the second end portion of the sleeve 4. When the sleeve 4 is moved by means of the valve position adjusting mechanism 13, the fluid or the air within the sleeve 4, specifically the volume of the fluid or the air within the second end portion of the sleeve 4 may be reduced/increased. At this point, the fluid or the air within the second end portion of the sleeve 4 may flow out through the first through holes, and the fluid or the air may freely flow in and out in the sleeve 4, thereby reducing the level of the slide resistance of the sleeve 4 sliding on the inner surface of the valve body 2.

Figure 7A:
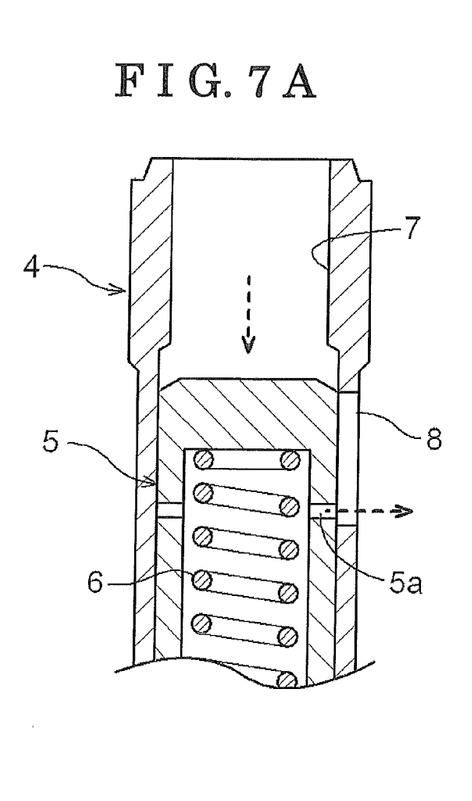
FIGS. 7A and 7B each illustrates a diagram indicating yet another embodiment of the relief valve related to this disclosure.
Figure 7B:
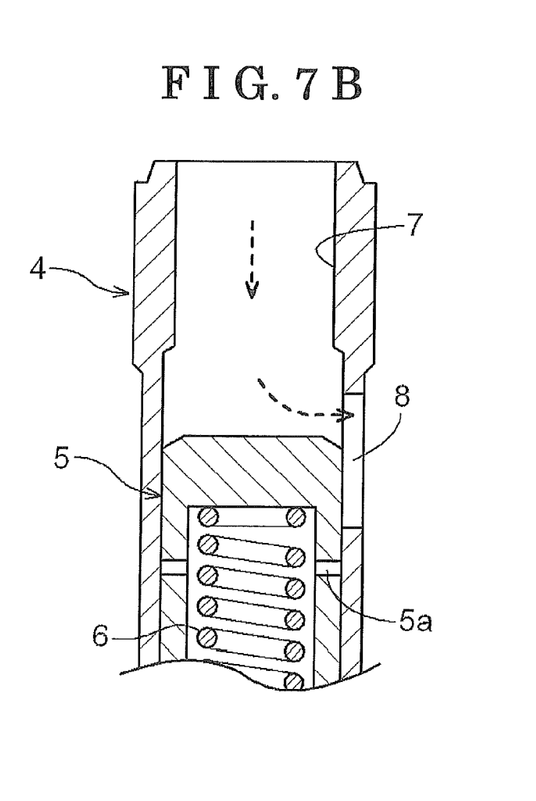

According to the relief valve 1 of the embodiment, as illustrated in FIGS. 7A and 7B, the valve 5 may be formed with second through holes 5a through which the fluid or the air within the second end portion of the sleeve 4 relative to the valve 5 may be discharged. When the valve 5 is pressed down by the fluid pressure of the first port 11, the fluid or the air within the second end portion of the sleeve 4 might be a resistance of the movement of the valve 5. At this point, because of the second through holes 5a of the valve 5, while the valve 5 is pressed down by the fluid pressure of the first port 11 as illustrated in FIG. 7A, the fluid or the air may flow out to the second port 12 through the second through holes 5a and the outlet 8 of the sleeve 4. Accordingly, the fluid in the second end portion of the sleeve 4 may preferably flow out through the outlet 8 of the sleeve 4, thereby smoothing the movement of the valve 5. When the valve 5 is moved so as to be distant from the inlet 7 of the sleeve 4 and is turned to be the opening state as illustrated in FIG. 7B, the second through holes 5*a* do not communicate with the outlet 8.

The relief valve according to this disclosure is adapted not only to an apparatus to adjust the fluid pressure of the oil for lubricating the engine, but used for various types of fluid pressure adjustments.

According to an aspect of this disclosure, a relief valve includes a valve body having a first port through which fluid flows in the relief valve and a second port through which the fluid is discharged from the relief valve, a sleeve arranged so as to be slidable within the valve body and formed in a cylindrical shape having an inlet being communicatable with the first port and an outlet being communicatable with the second port, a valve being slidable within the sleeve by receiving a fluid pressure of the first port flowing through the inlet in order to establish a closing state at which the outlet is closed by the valve and an opening state at which the outlet is opened, the valve positioned so as to approach the inlet in the closing state and positioned so as to be distant from the inlet in the opening state, a biasing member applying a biasing force to the valve in a direction against the fluid pressure of the first port and a valve position adjusting mechanism actuated for operating the fluid pressure of the first port so as to act on the sleeve in a direction of the biasing force of the biasing member and changing the position of the sleeve relative to the valve body by turning on or off the operation of the fluid pressure of the first port so as to act on the sleeve.

Further, when the valve position adjusting mechanism is actuated, the fluid pressure of the first port acts on the valve at a first pressure value or more in order to discharge the fluid through the outlet, and when the valve position adjusting mechanism is not actuated, the fluid pressure of the first port acts on the valve at a second pressure value or more in order to discharge the fluid through the outlet, wherein the second pressure value is set to be greater than the first pressure value.

In this configuration, a position of the sleeve relative to the valve body may be changed by the valve position adjusting mechanism that turns on/off the acting of the fluid pressure of the first port to the sleeve. Specifically, when the valve position adjusting mechanism controls the fluid pressure so as to act on the sleeve (turning on), the fluid pressure of the first port acts on the sleeve in a direction against the fluid pressure from the first port, thereby moving the sleeve toward the first port so as to be in a first state. On the other hand, when the valve position adjusting mechanism controls the fluid pressure so as not to act on the sleeve, only the fluid pressure of the first port acts on the sleeve (turning off), thereby moving the sleeve away from the first port and moving the sleeve toward the second port so as to be in a second state.

When the sleeve is in the first state, in accordance with the movement of the sleeve toward the first port, the outlet being communicatable with the second port may approach the first port. At this point, the valve is also moved toward the first port together with the sleeve, thereby changing the state of the biasing member so as to be extended. Accordingly, even when the fluid pressure of the fluid supplying passage is relatively low, the biasing member biasing the valve toward the first port can be pressed toward the side where the first port is not provided so that the valve opens the outlet of the sleeve. Accordingly, the first port communicates with the second port within the sleeve in order to discharge the excess oil within the fluid supplying passage. In this state, the level of the pressure to open the valve is set to be low.

When the sleeve is in the second state, in accordance with the movement of the sleeve toward the second port, the position of the outlet is changed so as to be distant from the first port. Further, the valve is also moved toward the second port together with the sleeve, and the biasing member of the valve is compressed. Thus, when the fluid pressure in the fluid supplying passage is low, the biasing member biasing the valve toward the first port may not be further compressed toward the side where the first port is not provided. On the other hand, when the sleeve is in the second state and when the fluid pressure in the fluid supplying passage is high, the biasing member biasing the valve toward the first port may be compressed toward the side where the first port is not provided so that the outlet is opened in order to communicate the first port with the second port within the sleeve, thereby discharging the excessive oil in the fluid supplying passage. At this point, the level of the pressure to open the valve of the relief valve is set to be high.

For example, when the relief valve related to this disclosure is used for an engine oil supplying passage, and when a temperature of the engine oil is low, the valve position adjusting mechanism turns on the acting of the fluid pressure of the first port on the sleeve in order to act the fluid pressure of the first port on the sleeve in the direction against the fluid pressure of the first port, thereby changing the relief valve (e.g., the sleeve) to be in the first state. Accordingly, the level of the pressure in the relief valve to open the valve is set to be low. Generally, when the relief valve is in a state where the valve may be easily opened, the oil may not be supplied to other portions of the engine to be lubricated. However, when a warm-up operation is executed for the engine, because the oil does not need to be supplied to portions by which a temperature of a piston and a cylinder is reduced (e.g., cooled), the engine may be effectively warmed-up by reducing a level of load for supplying the oil to the engine.

Further, when a rotational speed of the engine is low (low load), the valve position adjusting mechanism also turns on the actuation of the fluid pressure of the first port on the sleeve in order to act the fluid pressure of the first port on the sleeve in the direction against the fluid pressure of the first port, thereby changing the relief valve (e.g., the sleeve) to be in the first state. Accordingly, the level of the pressure to open the valve becomes low. When the rotational speed of the engine is low, because levels of frictions between the parts forming the engine are still low, there is less need to supply the oil to the parts of the engine. Accordingly, when the rotational speed of the engine is low, the oil is supplied only to the limited portions of the engine, therefore the engine runs effectively while reducing the friction of the oil pump.

Furthermore, even when an error occurs on the valve position adjusting mechanism due to sludge or the like existing in the oil, and the fluid pressure of the first port does not act to the sleeve in the direction against the fluid pressure of the first port, the fluid pressure of the first port acts on the sleeve so that the sleeve is distant from the first port and is moved toward the second port, and the relief valve (e.g., the sleeve) turns in the second state. Accordingly, the level of the pressure to open the valve is set to be high, and when the fluid pressure in the engine oil supplying passage is low, the valve may not be moved so as to compress the biasing member, which biases the valve toward the first port, toward the side where the first port is not provided. In this condition, because the outlet of the sleeve to be communicated with the second port is closed by the valve, the oil is supplied to the engine, thereby the engine is prevented from being burned-out in advance.

According to another aspect of this disclosure, the sleeve includes a first end surface facing the first port and a second end surface facing a passage of the valve position adjusting mechanism, and an area of the second end surface is set to be greater than an area of the first end surface.

In this configuration, when the fluid pressure of the first port acts on the second end surface of the sleeve, because the area of the second end surface of the sleeve is set to be larger than that of the first end surface, a level of a pressing force generated by the fluid pressure acting on the second end surface is larger than a level of a pressing force generated by the fluid pressure acting on the first end surface, as a result, the sleeve is surely moved toward the first port with such simple configuration.

According to yet another aspect of this disclosure, the sleeve slides relative to the valve body at sliding surfaces, one of the sliding surfaces being set on an outer circumferential surface of the sleeve in the vicinity of the first end surface, and the other of the sliding surfaces being set on the outer circumferential surface of the sleeve in the vicinity of the second end surface.

Because the position of the sleeve is changed by use of the fluid pressure of the first port, a level of slide resistance relative to the valve body is preferably set to be smaller. The sleeve of the relief valve of this disclosure slides on the valve body at the two sliding surfaces, each of which are formed in the vicinity of each end surface, accordingly, a total area of the sliding surfaces may be reduced with maintaining a posture of the sleeve so as to not to be inclined relative to an axis of the valve body, thereby reducing the friction force generated between the sleeve and the valve body.

According to further aspect of this disclosure, the sleeve is formed with a first through hole, and fluid or air existing within the sleeve at the side opposite to the first port relative to the valve may be discharged through the first through hole.

Generally, when the sleeve is moved by means of the valve position adjusting mechanism, the fluid or the air within the sleeve, specifically the volume of the fluid or the air existing at the side opposite to the first port relative to the valve may be reduced/increased. In this configuration, the fluid or the air existing at the side opposite to the first port relative to the valve may flow out through the first through holes, and the fluid or the air may freely flow in and out within the sleeve, thereby reducing the level of the slide resistance of the sleeve sliding on the inner surface of the valve body.

According to yet further aspect of this disclosure, the valve is formed with a second through hole, and fluid or air existing within the sleeve at the side opposite to the first port relative to the valve may be discharged through the second through hole When the valve is pressed by the fluid pressure from the first port, the fluid or the air existing at the side opposite to the first port relative to the valve may be a resistance for the movement of the valve. Because of the second through hole of the valve, while the valve is pressed by the fluid pressure of the first port, the fluid or the air may flow out to the second port through the second through hole and the outlet of the sleeve. Accordingly, the fluid or the air may preferably flow through the outlet of the sleeve, thereby smoothing the movement of the valve.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A relief valve comprising:
   a valve body including a first port through which fluid flows in the relief valve and a second port through which the fluid is discharged from the relief valve;
   a sleeve arranged so as to be slidable within the valve body and formed in a cylindrical shape having an inlet being communicatable with the first port and an outlet being communicatable with the second port;
   a valve being slidable within the sleeve by receiving a fluid pressure of the first port flowing through the inlet in order to establish a closing state at which the outlet is closed by the valve and an opening state at which the outlet is opened, the valve positioned so as to approach the inlet in the closing state and positioned so as to be distant from the inlet in the opening state;
   a biasing member applying a biasing force to the valve in a direction against the fluid pressure of the first port; and
   a valve position adjusting mechanism actuated for operating the fluid pressure of the first port so as to act on the sleeve in a direction of the biasing force of the biasing member and changing the position of the sleeve relative to the valve body by turning on or off the operation of the fluid pressure of the first port so as to act on the sleeve.

2. The relief valve according to claim 1, wherein, when the valve position adjusting mechanism is actuated, the fluid pressure of the first port acts on the valve at a first pressure value or more in order to discharge the fluid through the outlet, and when the valve position adjusting mechanism is not actuated, the fluid pressure of the first port acts on the valve at a second pressure value or more in order to discharge the fluid through the outlet, wherein the second pressure value is set to be greater than the first pressure value.

3. The relief valve according to claim 1, wherein the sleeve includes a first end surface facing the first port and a second end surface facing a passage of the valve position adjusting mechanism, and an area of the second end surface is set to be greater than an area of the first end surface.

4. The relief valve according to claim 2, wherein the sleeve includes a first end surface facing the first port and a second end surface facing a passage of the valve position adjusting mechanism, and an area of the second end surface is set to be greater than an area of the first end surface.

5. The relief valve according to claim 1, wherein the sleeve slides relative to the valve body at sliding surfaces, one of the sliding surfaces being set on an outer circumferential surface of the sleeve in the vicinity of the first end surface, and the other of the sliding surfaces being set on the outer circumferential surface of the sleeve in the vicinity of the second end surface.

6. The relief valve according to claim 2, wherein the sleeve slides relative to the valve body at sliding surfaces, one of the sliding surfaces being set on an outer circumferential surface of the sleeve in the vicinity of the first end surface, and the other of the sliding surfaces being set on the outer circumferential surface of the sleeve in the vicinity of the second end surface.

7. The relief valve according to claim 1, wherein the sleeve is formed with a first through hole, and fluid or air existing within the sleeve at the side opposite to the first port relative to the valve may be discharged through the first through hole.

8. The relief valve according to claim 2, wherein the sleeve is formed with a first through hole, and fluid or air existing within the sleeve at the side opposite to the first port relative to the valve may be discharged through the first through hole.

9. The relief valve according to claim 1, wherein the valve is formed with a second through hole, and fluid or air existing within the sleeve at the side opposite to the first port relative to the valve may be discharged through the second through hole.

10. The relief valve according to claim 2, wherein the valve is formed with a second through hole, and fluid or air existing within the sleeve at the side opposite to the first port relative to the valve may be discharged through the second through hole.

11. A relief valve comprising:
a valve body including a first port and a second port;
a sleeve accommodated within the valve body and having an inlet being communicatable with the first port and an outlet being communicatable with the second port;
a valve, accommodated within the sleeve, being moved to a side of the inlet in order to restrict a communication between the inlet and the outlet so and being moved to an opposite side of the inlet in order to allow the communication between the inlet and the outlet;
a biasing member applying a biasing force to the valve so as to move toward the inlet; and
a valve position adjusting mechanism actuated for changing positions of the sleeve and the valve relative to the valve body.

12. The relief valve according to claim 11, wherein the valve position adjusting mechanism is actuated for operating the fluid pressure of the first port so as to act on the sleeve in a direction of the biasing force of the biasing member.

13. The relief valve according to claim 11, wherein the valve position adjusting mechanism includes an oil switching valve being changed in a first state and a second state, and wherein, when the oil switching valve is in the first state, the valve position adjusting mechanism is actuated for operating the fluid pressure of the first port so as to act on the sleeve in a direction of the biasing force of the biasing member, and when the oil switching valve is in the second state, the valve position adjusting mechanism is actuated for not operating the fluid pressure.

* * * * *